A. & T. Vail,
Bake Pan.
N° 20,906. Patented July 13, 1858.
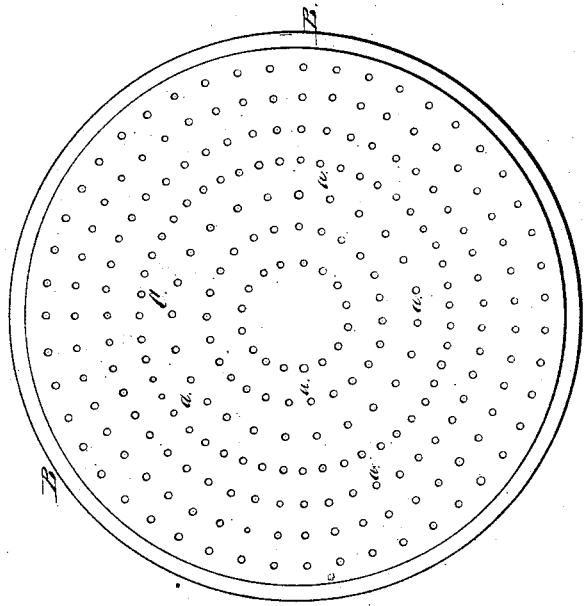
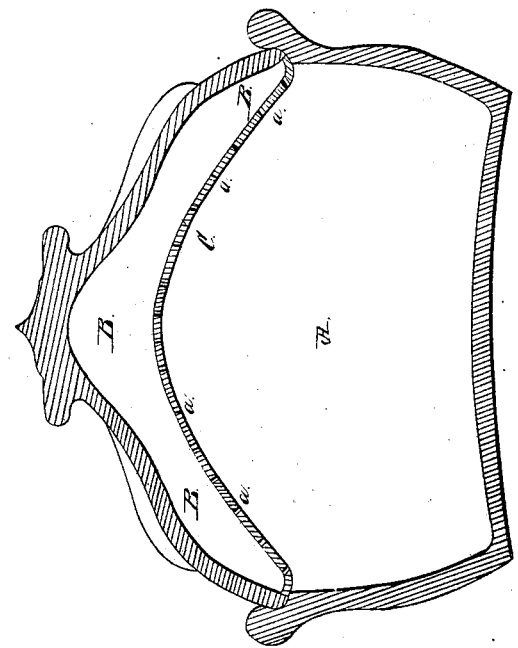

UNITED STATES PATENT OFFICE.

A. VAIL AND T. VAIL, OF BERLIN, WISCONSIN.

EARTHENWARE DISH.

Specification of Letters Patent No. 20,906, dated July 13, 1858.

*To all whom it may concern:*

Be it known that we, ALSON VAIL and TRACY VAIL, of Berlin, in the county of Marquette and State of Wisconsin, have invented a useful new Article of Manufacture—to wit, a Moisture-Absorbing Covered Dish; and we do hereby declare that the following is a full, clear, and exact description of the same, reference being had to the accompanying drawings, forming a part of this specification, in which—

Figure 1, is a vertical central section of a dish constructed after our invention. Fig. 2, is an inverted view of the top of the same.

Similar letters of reference, in each of the several figures indicate corresponding parts.

The nature of our invention consists in a new article of manufacture, constructed as hereinafter specified, to wit, a covered disk which will absorb the moisture or gases arising from hot eatables confined within the same.

To enable others, skilled in the art, to make and use our invention, we will proceed to describe its construction and operation.

A, represents the body and B, the cover of the dish. The body of the dish and the cover, when constructed especially with a view of being used for absorbing moisture from eatables, should be made of some argillaceous substance which is quite porous, and no glazing should be applied to the interior of the same; but the exterior surface should be glazed. The burning or hardening process may be performed in the usual manner. When it is desired to render dishes which are already in use, capable of absorbing the moisture from eatables, the interior surface of the body should be furnished with an argillaceous unglazed porous lining C. This lining may be fitted closely to the interior surface of the body and top of the dish, or it may be arranged so that a space shall exist between itself and the interior glazed surface of the dish. In this latter case it will be found advantageous to perforate the lining as shown at $a$, $a$, so as to hasten the escape of the moisture, and the deposit of the same, into the space, and upon the back surface of the lining.

Various substances may be used for forming the absorbing lining. In practice potters clay and sulfate of lime have been used with the most pleasing results, the eatables being found, after being confined a few minutes in dishes constructed with linings or porous interior surfaces formed of these substances in a dry and palatable condition.

The dish may be either round, many-sided, oblong or elliptical in form.

What we claim as our invention and desire to secure by Letters Patent, is—

A new article of manufacture, to wit, a covered dish with an absorbent lining, perforated or unperforated as herein specified, for the purposes set forth.

ALSON VAIL.
TRACY VAIL.

In presence of—
WILLIAM MACNISH,
ALPHEUS BISSELL.